W. D. HUFF.
ELECTRIC WATER HEATER.
APPLICATION FILED JULY 3, 1919.
1,343,134.
Patented June 8, 1920.
2 SHEETS—SHEET 1.
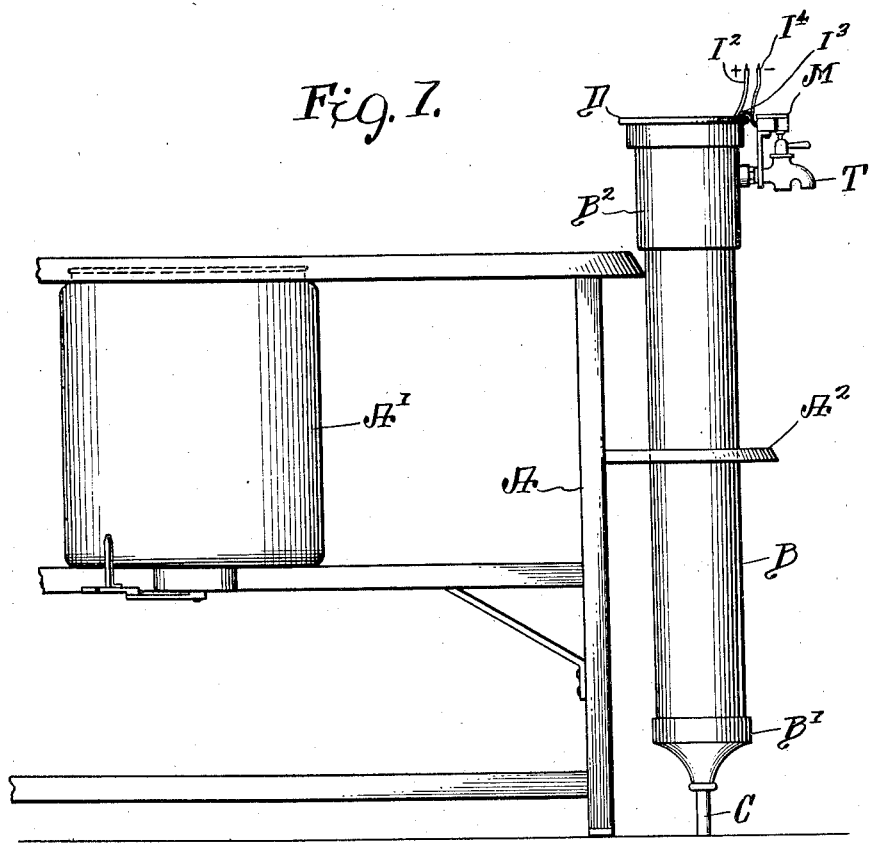
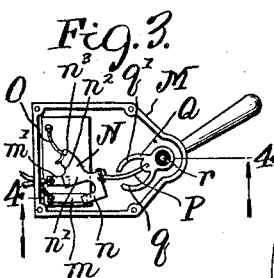
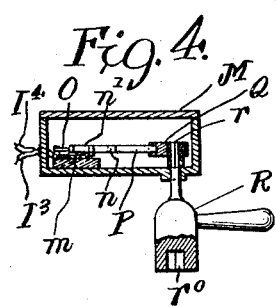
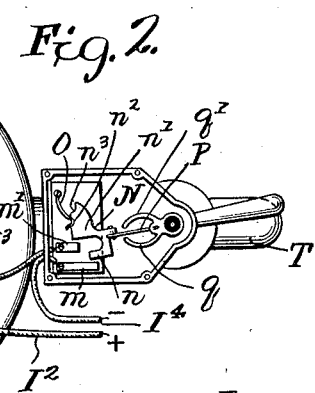
Inventor
William D. Huff.
by Wilkinson & Ginsta,
Attorneys.

W. D. HUFF.
ELECTRIC WATER HEATER.
APPLICATION FILED JULY 3, 1919.
1,343,134.
Patented June 8, 1920.
2 SHEETS—SHEET 2.
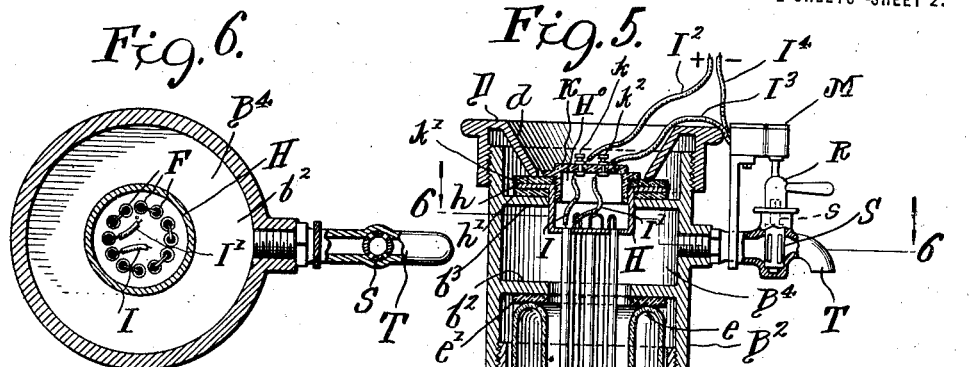
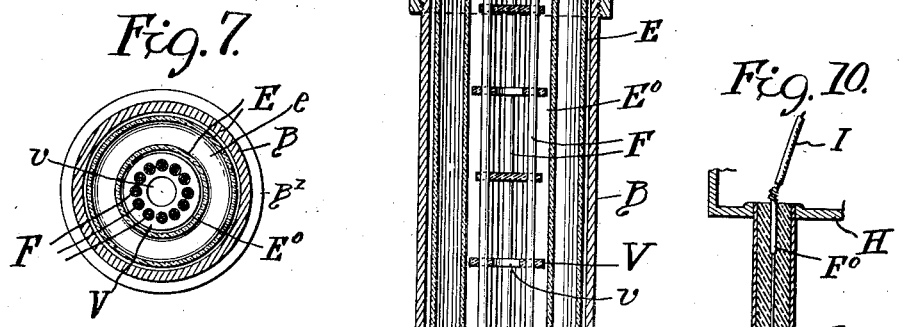
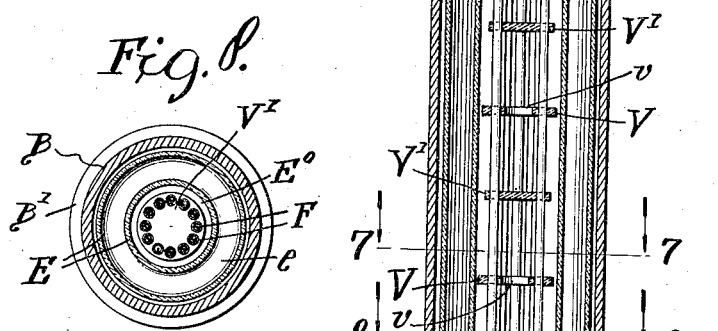
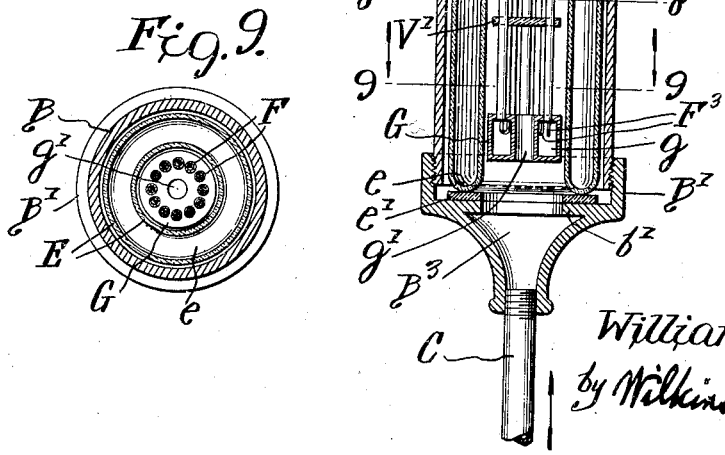
Inventor:
William D. Huff.
by Wilkinson & Giusta
Attorneys

UNITED STATES PATENT OFFICE.

WILLIAM DANIEL HUFF, OF LA FAYETTE, LOUISIANA, ASSIGNOR OF ONE-HALF TO JAMES J. CONNOLLY, OF ROANOKE, VIRGINIA.

ELECTRIC WATER-HEATER.

1,343,134.  Specification of Letters Patent.  Patented June 8, 1920.

Application filed July 3, 1919. Serial No. 308,352.

*To all whom it may concern:*

Be it known that I, WILLIAM DANIEL HUFF, a citizen of the United States, residing at La Fayette, in the parish of Lafayette and State of Louisiana, have invented certain new and useful Improvements in Electric Water-Heaters; and I do hereby declare the following to be a full, clear, and exact description of the invention, such as will enable others skilled in the art to which it appertains to make and use the same.

My present invention relates to improvements in electric water heaters, and it is intended to provide a simple and efficient device whereby water may be heated in small or large quantities and may be drawn off either warm or hot, as preferred, and whereby the water will be hottest at the point of delivery.

The invention is also intended to provide an arrangement by which cold water may be drawn through the heater by the simple turning of the cock in the reverse direction, and without disturbing any of the parts of the heating apparatus.

Most of the heaters used for the purpose of heating water are so arranged as to necessitate the heating of a large quantity of water before any of it reaches the desired high temperature.

According to my invention a very small quantity of water may be made hot without the waste of electric energy, or again the continuous use of the heater enables a large body of water to be made hot. Thus, it will be feasible to heat water enough only to fill a teapot or a coffee pot, or the like, or again to heat a whole tub full of water for bathing purposes, and to do either in a very brief period of time.

According to my invention I also so arrange the heating unit that there will be very little radiation therefrom, except for the active purpose of heating water, and thus there will be very little waste of heat through radiation, and also very little inconvenience to the attendant from the heat so radiated.

My invention will be more fully understood after reference to the accompanying drawings, in which like parts are indicated by similar reference symbols throughout the several views, and in which:—

Figure 1 shows an improved electric heater attached to an electric range of the character described in my co-pending application Ser. No. 308,351, filed July 3, 1919, and entitled Improvements in electrically heated culinary utensils.

Fig. 2 is a plan view of the electric heater with the top of the switch box removed, and the switch in the open or neutral position.

Fig. 3 is a plan view of the switch box with the top off, showing the switch in the closed position.

Fig. 4 shows a section along the line 4—4 of Fig. 3, and looking in the direction of the arrows, but with the top of the switch box in place.

Fig. 5 shows a central vertical section through the heater and the cock, parts being shown in elevation.

Fig. 6 shows a section along the line 6—6 of Fig. 5, and looking down.

Fig. 7 shows a section alone the line 7—7 of Fig. 5, and looking down.

Fig. 8 shows a section along the line 8—8 of Fig. 5, and looking down.

Fig. 9 shows a section along the line 9—9 of Fig. 5, and looking down; and

Fig. 10 is an enlarged sectional view of a portion of one of the heating tubes used in the device.

A represents the framework of the range having one or more electrically heated culinary utensils A′, such as described in my co-pending application aforesaid, which range is shown as provided with a suitable arm $A^2$ to engage the cylindrical shell B of the electric heater.

This shell B is closed at the lower end with the screw base B′ provided with an internal chamber $B^3$ and with the shoulder $b'$ above said chamber. Into this base B′ the pipe C for supplying water from the source of water supply is screwed, which pipe opens into the chamber $B^3$.

On the upper end of the cylindrical shell B the cylindrical casing $B^2$ is secured, which is provided with two annular ribs $b^2$ and $b^3$, providing a hot water chamber $B^4$ between said annular ribs, as will be hereinafter more fully described.

The upper end of this casing $B^2$ is closed by the screw cap D, having the downwardly inclined flange member $d$, as shown in Fig. 5.

E represents an annular hollow sleeve, preferably made of two glass cylinders connected together, top and bottom, as at $e$, with a chamber between the same, which chamber is exhausted of air so as to act in the nature of a thermos bottle, and limit the radiation or convection of heat from the heating wires laterally. A tight joint is made at the top and bottom of this vacuum sleeve by means of the gaskets $e'$, which may be made of any suitable material, such as rubber, leather, asbestos, or the like.

The interior of this annular hollow sleeve E forms a cylindrical chamber $E^0$ into which the tubes F containing the heating wires $F'$ project. These tubes F are connected at the bottom to an annular base G, having a hollow annular chamber $g$ provided therein, and said base is axially perforated, as at $g'$. The lower ends of the tubes project into said base, and the heating wires $F'$ are connected together at their lower ends, as at $F^3$, said connections projecting into said annular chamber $g$.

The upper ends of the tubes F are secured in the cup-shaped head H, which is flanged as at $h$, and said flange rests on the annular gasket $h'$ supported on the annular rib $b^3$ of the casing $B^2$. This cup-shaped head is closed by the cap K which rests on the gasket $k'$ above the flange $h$, and this gasket is pressed down by the inclined flange $d$ of the screw cap D, thus forming a tight joint. This cap K is also preferably screwed into the cap H so as to provide a closed chamber $H^0$ between the caps K and H.

The cap K carries the binding posts $k$ and $k^2$, which connect the terminals I and $I'$ of the heating wires to the electric supply main $I^2$, and the conductor $I^3$ leading to the switch box M from which the current is carried off or grounded through the conductor $I^4$.

The switch box M is secured at the side of the heater and may be supported in any convenient way, as by means of the bracket $M'$.

Mounted in the switch box M is the conducting plate N having contact shoulders $n$ and $n'$, and the holding notches $n^2$ and $n^3$ the said shoulders being adapted to engage the contact strips $m$ and $m'$ mounted in the switch box, and the said notches being adapted to engage the spring catch O, as shown in Figs. 2 and 3.

This plate N is attached to one end of the resilient arm P, the other end of which arm being attached to the yoke Q, having two arms $q$ and $q'$. This yoke is mounted on but is insulated from the head $r$ of the cap R, which is provided with a recess $r^0$ adapted to fit over the upper end of the stem $s$ of the valve S in the hot water delivery cock T. The valve passages in this cock are so arranged that the valve is open when the switch is closed, but when turned to one position, as to the right, the valve will be closed, and when turned to the other position, as to the left, when the switch is open, the valve will be open, so that in the third-named position cold water may be drawn through the heater while the current is off.

In order to bring the water into closer relation with the heating device as it passes up through the heater from the pipe C to the hot water chamber $B^4$, I provide a series of baffle plates, which may be used also as guides or braces for the rods F, such as the rings V and the disks $V'$. It will be seen that as the water rises through the heater it will pass around the outer edges of said disks and will then rise up through the perforations $v$ in the center of said rings, thus following a tortuous path between and in close contact with the various heating tubes.

I preferably use very fine wire in the form of straight lengths $F'$ for the heating tubes, each of which wires $F'$ may be connected to a larger rod $F^0$, and these rods $F'$ and terminals $F^0$ are preferably sheathed in a casing of glass or other nonconducting material, such as $F^2$ in Fig. 10.

In order to prevent the heating wires from becoming oxidized in the presence of air, I preferably make the chambers $H^0$ and $g$ air-tight and exhaust the air therefrom and then fill the same with nitrogen or other inert gas, preferably nitrogen. In this way the danger from burning out of the fine wires or electrical connections contained in the heater proper will be obviated, and the lifetime of these parts may be largely increased.

The operation of the device is as follows:

Assuming the cock to be closed, and the current off, in order to draw hot water turn the cock far enough to turn on the current but to leave a small flow of water only from the cock, the water will slowly rise from the pipe C and will pass around the baffle plates V and $V'$ and will finally enter the hot water chamber $B^4$, by which time it will become highly heated, and by opening the cock further any desired quantity of this hot water may be drawn off.

By keeping the cock open, the supply of hot water will continue indefinitely.

By closing the cock the current will be immediately cut off and only a very small quantity of water will remain in the heater.

Where the heater is often used there will always remain a sufficient supply of hot water in the top of the heater to justify the turning on of the cock to the full opening at the start.

In order to draw cold water, turn the cock in the reverse direction, to the cold water position, and the current being still off, cold water will flow up through the heater.

It will be noted that as the water rises up through the chamber E⁶ there will be very little radiation laterally, and practically all of the heat from the heating tubes will be supplied to the water before it reaches the hot water chamber B⁴.

In order to take the heater apart for purposes of inspection, cleaning or repair, it will only be necessary to disengage the conductors I² and I³ from the binding posts $k$ and $k'$, take off the cap D and the washer $h'$ and remove the cap H carrying the tubes and other parts attached thereto. The cap K may or may not be removed if desired.

The casing B² may be unscrewed from the cylinder B and the hollow sleeve E may be removed, thus securing access to the interior of the cylinder B, or if desired this cylinder may also be removed, and the lower gasket $e'$ taken out and the base B' may also be unscrewed from the pipe C, so that the entire apparatus may be quickly and conveniently assembled or disassembled without the necessity of having any special tools.

While I have shown the current carried through the heating tubes in series, it will be obvious that the switch connections may carry the current through the various heating tubes in multiple or in groups; thus where it is only desired to have comparatively warm water the switch arrangement may be so constructed as to cut out two-thirds of the tubes, and the number of tubes cut in or out may be varied by varying the switch arrangement as provided, or the current may be regulated by using any well known rheostat. These are well known expedients, however, of general knowledge in the electrical art and do not *per se* constitute a part of my present invention.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. An electric water-heater comprising an outer casing with means for supplying water thereto and carrying off water therefrom, two hollow annular heads mounted in said casing, tubes connecting said heads, the joints in said heads and tubes being substantially air-tight, a hollow sleeve containing a chamber from which the air has been exhausted surrounding said tubes, heating wires rove through said tubes, and means for conveying an electric current to said wires, with an inert gas filling the hollow portion of said heads and said tubes, substantially as and for the purposes described.

2. An electric water heater comprising an outer casing with means for supplying water thereto and a cock for carrying off water therefrom provided with a handle, two heads mounted in said casing, tubes connecting said heads, a hollow sleeve containing a chamber from which the air has been exhausted surrounding said tubes, heating wires rove through said tubes, a source of electricity, and a switch operated by said cock handle for throwing the electric current on or off of said wires, substantially as described.

3. An electric water heater comprising an outer casing with means for supplying water thereto and a cock for carrying off water therefrom, provided with a handle, two heads mounted in said casing, tubes filled with insulating material connecting said heads, a hollow sleeve containing a chamber from which the air has been exhausted surrounding said tubes, fine heating wires rove through the insulating material in said tubes, a source of electricity, and a switch operated by said cock handle for throwing the electric current on or off of said wires, substantially as described.

4. An electric water heater comprising an outer casing with means for supplying water thereto and carrying off water therefrom, two heads mounted in said casing, tubes connecting said heads, a hollow sleeve containing a chamber from which the air has been exhausted surrounding said tubes, heating wires rove through said tubes, baffle plates arranged transversely of said tubes to cause the water to flow in a zigzag course around said tubes, and means for conveying an electric current through said wires, substantially as described.

5. An electric water heater comprising an outer casing with means for supplying water thereto and carrying off water therefrom, heads mounted in said casing, tubes filled with insulating material connecting said heads, a hollow sleeve containing a chamber from which the air has been exhausted surrounding said tubes, fine heating wires rove through the insulating material in said tubes, baffle plates arranged transversely of said tubes to cause the water to flow in a zigzag course around said tubes, and means for conveying an electric current through said wires, substantially as described.

6. An electric water heater comprising an outer casing with means for supplying water thereto and carrying off water therefrom, two hollow annular heads mounted in said casing, tubes filled with insulating material connecting said heads, the joints in said heads and tubes being substantially air-tight, a hollow sleeve containing a chamber from which the air has been exhausted surrounding said tubes, fine heating wires rove through the insulating material in said tubes, baffle plates arranged transversely of said tubes to cause the water to flow in a zigzag course around said tubes, and means for conveying an electric current to said wires, with an inert gas filling the hollow portion of said heads and said tubes, substantially as and for the purposes described.

7. An electric water heater comprising an outer casing with means for supplying water thereto and carrying off water therefrom, two hollow annular heads mounted in said casing, tubes connecting said heads, the joints in said heads and tubes being substantially air-tight, a hollow sleeve containing a chamber from which the air has been exhausted surrounding said tubes, heating wires rove through said tubes, baffle plates arranged transversely of said tubes to cause the water to flow in a zigzag course around said tubes, and means for conveying an electric current to said wires, with an inert gas filling the hollow portion of said heads and said tubes, substantially as and for the purposes described.

8. An electric water heater comprising an outer casing with means for supplying water thereto and a cock for carrying off water therefrom provided with a handle, two heads mounted in said casing, tubes connecting said heads, a hollow sleeve containing a chamber from which the air has been exhausted surrounding said tubes, heating wires rove through said tubes, baffle plates arranged transversely of said tubes to cause the water to flow in a zigzag course around said tubes, a source of electricity, and a switch operated by said cock handle for throwing the electric current on and off of said wires, substantially as described.

9. An electric water heater comprising an outer casing with means for supplying water thereto and a cock for carrying off water therefrom, provided with a handle, two heads mounted in said casing, tubes filled with insulating material connecting said heads, a hollow sleeve containing a chamber from which the air has been exhausted surrounding said tubes, fine heating wires rove through the insulating material in said tubes, baffle plates arranged transversely of said tubes to cause the water to flow in a zigzag course around said tubes, a source of electricity, and a switch operated by said cock handle for throwing the electric current on or off of said wires, substantially as described.

WILLIAM DANIEL HUFF.